United States Patent
Peyronny

(10) Patent No.: US 6,470,143 B1
(45) Date of Patent: Oct. 22, 2002

(54) HEATING DOOR WITH SPRING-MOUNTED HEATERS

(76) Inventor: Bernard Peyronny, Mas de la Fau-vette-Chemin du Trentin, 84250 Le Thor (FR)

( * ) Notice: Subject to any disclaimer, the term of this patent is extended or adjusted under 35 U.S.C. 154(b) by 0 days.

(21) Appl. No.: 09/806,470

(22) PCT Filed: Oct. 1, 1999

(86) PCT No.: PCT/FR99/02338

§ 371 (c)(1), (2), (4) Date: Apr. 2, 2001

(87) PCT Pub. No.: WO00/20802

PCT Pub. Date: Apr. 13, 2000

(30) Foreign Application Priority Data

Oct. 2, 1998 (FR) .............................. 98 12583

(51) Int. Cl.⁷ .............................. F24D 13/02; E06B 7/00
(52) U.S. Cl. .................. 392/372; 219/213; 219/542; 392/435; 338/316; 338/283
(58) Field of Search ................ 392/372, 435, 392/433; 219/213, 542; 338/283, 316, 319; 312/236

(56) References Cited

U.S. PATENT DOCUMENTS

| | | | | |
|---|---|---|---|---|
| 1,378,247 A | * | 5/1921 | Lightfoot | .................. 338/316 |
| 2,493,125 A | * | 1/1950 | Foster | .................. 392/372 |
| 2,988,626 A | | 6/1961 | Buttner | |
| 3,394,412 A | * | 7/1968 | Olssen | .................. 392/372 |
| 3,799,387 A | | 3/1974 | Zenz | |
| 3,859,502 A | * | 1/1975 | Heaney | .................. 219/218 |
| 4,039,775 A | * | 8/1977 | Andra | .................. 219/385 |
| 4,163,144 A | | 7/1979 | Réynier | |
| 4,713,647 A | | 12/1987 | Allen et al. | |
| 5,872,888 A | * | 2/1999 | Peyronny | .................. 392/346 |

FOREIGN PATENT DOCUMENTS

| | | | | |
|---|---|---|---|---|
| DE | 2337230 | * | 1/1975 | |
| FR | 2220004 | * | 11/1974 | |
| FR | 2367181 | | 5/1978 | |
| FR | 2721472 | | 12/1995 | |
| GB | 1240642 | * | 7/1971 | ................ 392/372 |
| JP | 5-34048 | * | 2/1993 | |
| JP | 8-200717 | | 12/1996 | |
| JP | 9-328972 | * | 12/1997 | |
| JP | 10-339078 | * | 12/1998 | |
| WO | 9812483 | * | 3/1998 | |

OTHER PUBLICATIONS

English Language Abstract of JP 8–200717.

* cited by examiner

Primary Examiner—John A. Jeffery
(74) Attorney, Agent, or Firm—Greenblum & Bernstein, P.L.C.

(57) ABSTRACT

A heating door comprises a frame. A first panel is mounted to the frame. A second panel is mounted to the frame. A sheet is disposed between the first and second panels. The sheet defines an inner section between the first panel and the sheet and an outer section between the second panel and the sheet. At least one heating mechanism is arranged in at least one of the first and the second section.

28 Claims, 1 Drawing Sheet

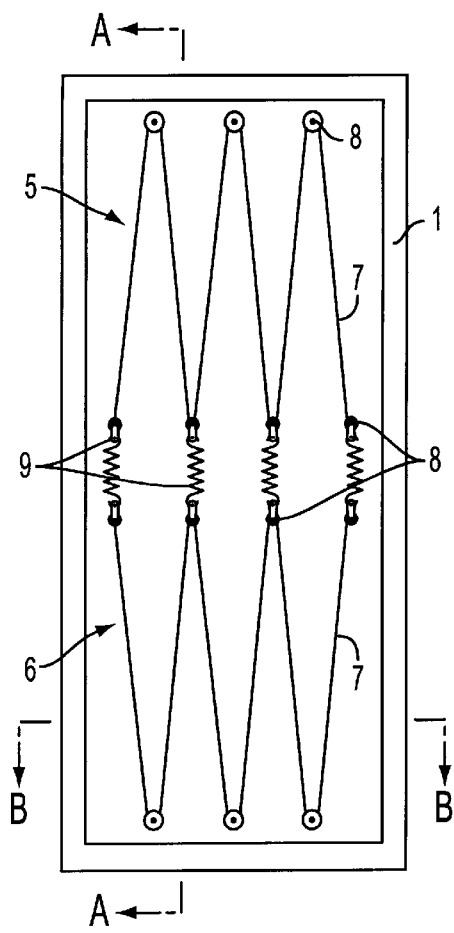
FIG. 1
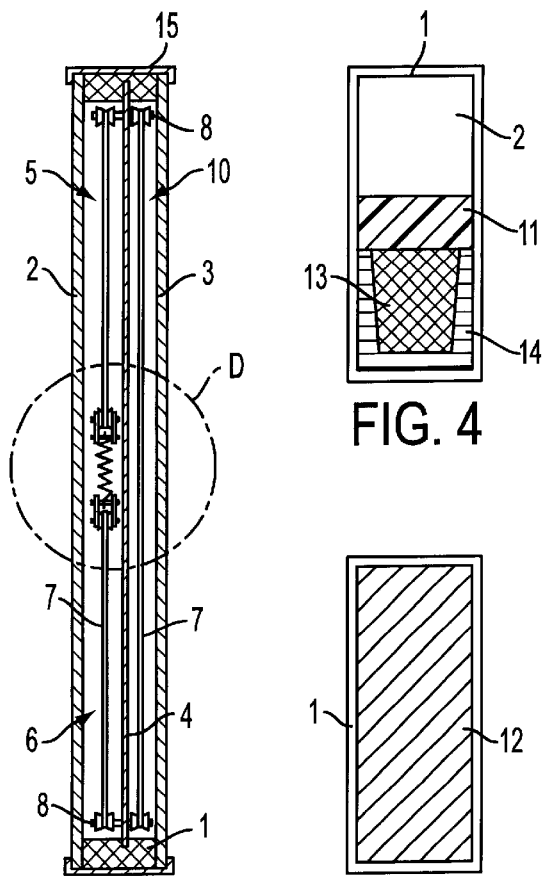
FIG. 2
FIG. 4
FIG. 5
FIG. 3
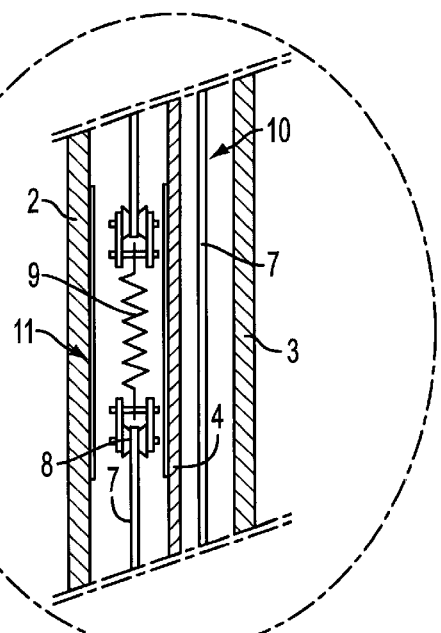
FIG. 6

HEATING DOOR WITH SPRING-MOUNTED HEATERS

CROSS-REFERENCE TO RELATED APPLICATIONS

The present application is a National Stage Application of International Application No. PCT/FR99/02338, filed Oct. 1, 1999, which was not published under PCT Article 21(2) in English. Further, the present application claims priority under 35 U.S.C. §119 of French Patent Application No. 98/12583 filed on Oct. 2, 1998.

BACKGROUND OF THE INVENTION

1. Field of the Invention

The present invention relates to a heating door.

The invention is adapted to the primary or supplemental heating for all types of premises, such as houses, apartments, offices, stores, or other private or professional premises.

2. Discussion of Background Information

For the heating of premises such as dwellings, offices, or professional premises, central heating systems are increasingly abandoned in favor of self-contained individual units, due to the difficulties encountered in controlling and optimizing energy consumption in large installations.

The most commonly used sources of energy are fuel, gas, and electricity. The latter has numerous advantages such as versatility, cleanliness, comfort, ease of adjustment and programming, low investment, etc; but the ratio of its cost to the Kilowatt/hour is substantially higher than for the other two types of energy. This has motivated the development of "integrated heating," associating electric heaters with thermal insulation of the premises. Nowadays, in order to save energy, new buildings must be well-insulated, and electricity is more frequently selected as a source of energy.

Electric heating is most often ensured by way of convectors fixed against the walls in the same manner as water or steam radiators.

These apparatuses, which are metallic, are unaesthetic and reduce the usable surface of the walls of the premises in which they are installed.

The Patent No. FR 2 721 472 filed by the Applicant of the present invention describes a heating door comprising in its lower portion, a heating body made of a shielded resistance embedded in a light metallic alloy unit, two vertical lateral plates forming, together with tubular sections, an enclosure enabling air circulation. Each side has bottom and top recessed elements opened outwardly to enable the input and output, respectively, of air in the enclosure.

The U.S. Pat. No. 4 163 144, in the name of Jacques REYNIER, discloses a heated door made of two fire-resistant wooden panels, which are spaced apart by laths defining a series of vertical compartments, at the base of each of which electric heating elements are arranged, openings with deflectors being provided at the top and bottom of the two panels for the passage of heated air.

The manufacturing cost of these devices is relatively high due to the number or the particular technology of their heating bodies, and the air outlet at the top portion makes it difficult to obtain a good distribution of temperature.

SUMMARY OF THE INVENTION

The invention provides for a heating door comprising a frame, a first panel mounted to the frame, a second panel mounted to the frame, a sheet disposed between the first and second panels, the sheet defining an inner section between the first panel and the sheet and an outer section between the second panel and the sheet, and at least one heating mechanism arranged in at least one of the first and the second section.

The heating mechanism may comprise at least one set of heating wire. The at least one set of heating wire may comprise an upper and a lower heating wire. The upper heating wire may be fixed to an upper element of the frame and the lower heating wire may be fixed to a lower element of the frame. The door may further comprise insulating blocks connecting the upper and lower heating wires to the upper and the lower elements of the frame. The door may further comprise at least one expansion compensating spring connecting the upper and the lower heating wires. The heating door may be adapted for primary or supplemental heating of all types of premises. The premises may comprise at least one of houses, apartments, offices, stores, and private or professional premises. The at least one of the first and second panels may be made of particle board or a synthetic material. The sheet may comprise a metal sheet. The door may further comprise at least one spring connecting the upper and the lower heating wires. The door may further comprise at least one insulating block arranged to insulate the at least one spring from at least one of the upper and the lower heating wire. The at least one spring may be arranged at a mid-height of the door. The at least one heating mechanism may be arranged in each of the first and the second sections.

A power to the at least one heating mechanism may be controllable. The power may comprise between 100 and 200 watts. A total power used by the heating mechanisms of each of the first and second sections may be close to 850 watts. The total power may be close to 1000 watts.

At least one of the first and second panels may be curved. At least one of the first and second panels may be curved vertically so as to avoid a risk of deformation due to expansion. The frame may comprise a peripheral metallic frame which is adapted to increase a rigidity of the door. The door may further comprise at least one heat shield arranged on at least one of the first and the second panels. The at least one heat shield may comprise aluminum foil which is attached to at least one of the first and second panels. The at least one heat shield may comprise aluminum foil which is attached to a portion of one of the first and second panels. The portion may comprise a lower half of an inner surface of at least one of the first and the second panels. The at least one heating mechanism may comprise a heating wire made of a metallic alloy coated with a synthetic material which is capable of withstanding a continuous temperature greater than 200° C., the at least one heating mechanism being adapted to uniformly heat at least one surface of the door.

The invention also provides for a heating door comprising a frame, a first panel mounted to the frame, a second panel mounted to the frame, a sheet mounted to the frame and disposed between the first and second panels, the sheet defining an inner space between the first panel and the sheet and an outer space between the second panel and the sheet, and an upper heating mechanism arranged in at least one of the first and the second section, a lower heating mechanism arranged in at least one of the first and the second section, and a plurality of springs connecting the upper and the lower heating mechanisms.

The invention further provides for a heating door comprising a frame, a first panel mounted to the frame, a second panel mounted to the frame, a sheet mounted to the frame and disposed between the first and second panels, the sheet defining an inner space between the first panel and the sheet and an outer space between the second panel and the sheet, and an upper heating wire arranged in at least one of the first and the second section, a lower heating wire arranged in at least one of the first and the second section, and a plurality of springs connecting the upper and the lower heating wires, wherein at least one of the first and the second panels is curved.

The device according to the present invention eliminates all of these disadvantages. Indeed, it makes it possible to obtain electric heating units which free the walls entirely, ensuring an excellent distribution of temperature, and have a low manufacturing cost.

The invention provides for a door made of two front panels mounted on a frame so as to form an enclosure divided into two sections in the thickness by. a metal sheet, the section on the room side being equipped with a high set and a low set of heating wires mounted on insulating bocks arranged at the ends of expansion compensating springs and at the upper and lower portions of the door.

BRIEF DESCRIPTION OF THE DRAWINGS

In the annexed schematic drawings, provided by way of a non-limiting example of one of the embodiments of the object of the invention:

FIG. 1 shows a door without a panel, seen from the room side,

FIG. 2 is a vertical cross-section along the arrows A–A of FIG. 1,

FIG. 3 is a horizontal cross-section along the arrows B–B of FIG. 1,

FIGS. 4 and 5 show, on a small scale, the inner surface of the front panels from the room side and from the hallway side, respectively, and FIG. 6 is an enlargement of the detail D of FIG. 2.

DETAILED DESCRIPTION OF THE INVENTION

The heating door, FIGS. 1–6, is constituted of a rectangular frame 1 carrying two front panels made of a particle board or a synthetic material, a room side panel 2 and a hallway side panel 3. The enclosure thus constituted is separated into two sections by a steel sheet 4 parallel to the panels 2, 3 and ensuring a uniform surface temperature.

In the section located on the side of the door inside the premise to be heated preferably, hereinafter referred to as "room side," two parallel fed sets 5, 6 of electric heating wire 7 are arranged in the upper portion and lower portion, respectively.

In order to compensate for the expansion, while maintaining an adequate tension to avoid any contact with the walls, the two heating wires 7 are fixed on insulating blocks 8 mounted next to the upper and lower elements of the frame 1, on the one hand, and to the ends of springs 9 located at mid-height of the door, on the other hand, each spring having one end hooked to the wire of the upper set 5, and one end hooked to the wire of the lower set 6. Preferably, the ends of the springs carry the insulating blocks 8. The distribution of the wires 7 of each set is symmetrical so that the expansion does not cause any displacement of the support points constituted by the springs 9 and the blocks 8. However, to ensure a good distribution of the heat flows along the height of the door, the power of the two sets 5, 6, could be made different by using heating wires 7 with different resistivity.

A third set 10 of heating wire 7 can be used on the hallway side. Its power, on the order of 100 to 200 watts, is substantially lower than that of the sets on the room side (room side +hallway side: about 1000 W), which makes it possible to simply mount it on insulating blocks 8 located at the top and bottom of the door without using expansion compensating springs.

Alternatively, for certain applications, the section on the room side can comprise only one set of heating wire 7, one of the ends of the springs 9 being fixed. In this case, the total power is close to 850 W.

The heating wires 7, made of metallic alloy coated with a synthetic material capable of withstanding a continuous temperature greater than 200° C., are arranged so as to render the surface temperatures of the door uniform.

Flexible insulating films 11 are fixed against the separating metal sheet 4 and the panel 2 on the room side, at the level of the springs 9 and blocks 8 to electrically insulate them from the metal portions.

To ensure an optimum heat distribution, the inner surface of the front panels is covered with heat shields constituted of adhered aluminum foils. The shield 12 on the hallway side covers the entire surface of the corresponding panel 3, whereas the heat shield 13 only covers the lower half of the panel 2 on the room side.

A heat shield 12 is created on the hallway side by gluing aluminum over the entire internal surface of the panel 3, and another heat shield 13 on the lower half of the inner surface of the panel 2 on the room side.

For the same purpose, strips 14 of dull blue paint are arranged along the lateral and lower edges of the inner surface of the panel 2 on the room side.

The front panels 2, 3 are advantageously curved vertically to avoid the risks of deformation due to expansion (distance E between center and sides of the panels on the order of 5 millimeters), and a peripheral metallic frame 15 can be provided to increase the rigidity of the assembly.

The functioning of the sets 5, 6, 10 of the heating wire is controlled by an electronic system of a known type meeting the standards in force.

The positioning of the various constituent elements meets the object of the invention with a maximum of useful effects which had not, to date, been obtained by similar devices.

What is claimed is:

1. A heating door comprising:

a frame;

a first panel mounted to the frame;

a second panel mounted to the frame;

a sheet disposed between the first and second panes;

the sheet defining an inner section between the first panel and the sheet and an outer section between the second panel and the sheet;

at least one heating mechanism arranged in at least one of the first and the second section;

a space between one of said first panel and said second panel and the sheet, said space extending an entire width of the door; and a heating element arranged in said space, spaced from said one of the first panel and the second panel and the sheet, and extending the entire width of the door.

2. The door of claim 1, wherein the heating mechanism comprises at least one set of heating wire.

3. The door of claim 2, wherein the at least one set of heating wire comprises an upper and a lower heating wire.

4. The door of claim 1, wherein the heating door is adapted for primary or supplemental heating of all types of premises.

5. The door of claim 4, wherein the premises comprise at least one of houses, apartments, offices, stores, and private or professional premises.

6. The door of claim 1, wherein at least one of the first and second panels is made of particle board or a synthetic material.

7. The door of claim 1, wherein the sheet comprises a metal sheet.

8. The door of claim 1, wherein a power to the at least one heating mechanism is controllable.

9. The door of claim 1, wherein the power is comprised between 100 and 200 watts.

10. The door of claim 1, wherein at least one of the first and second panels is curved.

11. The door of claim 10, wherein at least one of the first and second panels is curved vertically so as to avoid a risk of deformation due to expansion.

12. The door of claim 1, wherein the frame comprises a peripheral metallic frame which is adapted to increase a rigidity of the door.

13. The door of claim 1, further comprising at least one heat shield arranged on at least one of the first and the second panels.

14. The door of claim 13, wherein the at least one heat shield comprises aluminum foil which is attached to a portion of one of the first and second panels.

15. The door of claim 14, wherein the portion comprises a lower half of an inner surface of at least one of the first and the second panels.

16. The door of claim 13, wherein the at least one heat shield comprises aluminum foil which is attached to at least one of the first and second panels.

17. The door of claim 1, wherein the at least one heating mechanism comprises a heating wire made of a metallic alloy coated with a synthetic material which is capable of withstanding a continuous temperature greater than 200° C., the at least one heating mechanism being adapted to uniformly heat at least one surface of the door.

18. A heating door comprising:
a frame;
a first panel mounted to the frame;
a second panel mounted to the frame;
a sheet disposed between the first and second panels;
the sheet defining an inner section between the first panel and the sheet and an outer section between the second panel and the sheet; and
at least one heating mechanism arranged in at least one of the first and the second section, said heating mechanism comprising an upper and a lower heating wire, the upper heating wire being fixed to an upper element of the frame and the lower heating wire being fixed to a lower element of the frame.

19. The door of claim 18, further comprising insulating blocks connecting the upper and lower heating wires to the upper and the lower elements of the frame.

20. A heating door comprising:
a frame;
a first panel mounted to the frame;
a second panel mounted to the frame;
a sheet disposed between the first and second panels;
the sheet defining an inner section between the first panel and the sheet and an outer section between the second panel and the sheet;
at least one heating mechanism arranged in at least one of the first and the second section, said heating mechanism comprising an upper and a lower heating wire; and
at least spring connecting the upper and the lower heating wires.

21. The door of claim 20, wherein said at least one spring comprises at least one expansion compensating spring.

22. The door of claim 20, further comprising at least one insulating block arranged to insulate the at least one spring from at least one of the upper and the lower heating wire.

23. The door of claim 20, wherein the at least one spring is arranged at a mid-height of the door.

24. A heating door comprising:
a frame;
a first panel mounted to the frame;
a second panel mounted to the frame;
a sheet disposed between the first and second panels;
the sheet defining an inner section between the first panel and the sheet and an outer section between the second panel and the sheet; and
at least one heating mechanism arranged in each of the first and the second sections.

25. The door of claim 24, wherein a total power used by the heating mechanisms of each of the first and second sections is close to 850 watts.

26. The door of claim 25, wherein the total power is close to 1000 watts.

27. A heating door comprising:
a frame;
a first panel mounted to the frame;
a second panel mounted to the frame;
a sheet mounted to the frame and disposed between the first and second panels;
the sheet defining an inner space between the first panel and the sheet and an outer space between the second panel and the sheet; and
an upper heating mechanism arranged in at least one of the first and the second section;
a lower heating mechanism arranged in at least one of the first and the second section; and
a plurality of springs connecting the upper and the lower heating mechanisms.

28. A heating door comprising:
a frame;
a first panel mounted to the frame;
a second panel mounted to the frame;
a sheet mounted to the frame and disposed between the first and second panels;
the sheet defining an inner space between the first panel and the sheet and an outer space between the second panel and the sheet; and
an upper heating wire arranged in at least one of the first and the second section;
a lower heating wire arranged in at least one of the first and the second section; and
a plurality of springs connecting the upper and the lower heating wires,
wherein at least one of the first and the second panels is curved.

* * * * *